United States Patent
Perlman et al.

(10) Patent No.: US 7,709,038 B2
(45) Date of Patent: *May 4, 2010

(54) PREPARED FOODS CONTAINING TRIGLYCERIDE-RECRYSTALLIZED NON-ESTERIFIED PHYTOSTEROLS

(75) Inventors: Daniel Perlman, Arlington, MA (US); Kenneth Hayes, Wellesley, MA (US); Andrzej Pronczuk, Boston, MA (US)

(73) Assignee: Brandeis University, Waltham, MA (US)

( * ) Notice: Subject to any disclaimer, the term of this patent is extended or adjusted under 35 U.S.C. 154(b) by 728 days.

This patent is subject to a terminal disclaimer.

(21) Appl. No.: 11/475,575

(22) Filed: Jun. 26, 2006

(65) Prior Publication Data

US 2006/0251790 A1     Nov. 9, 2006

Related U.S. Application Data

(63) Continuation of application No. 10/677,634, filed on Oct. 1, 2003, now Pat. No. 7,144,595, which is a continuation-in-part of application No. PCT/US02/36809, filed on Nov. 14, 2002, and a continuation-in-part of application No. 10/295,929, filed on Nov. 14, 2002, now Pat. No. 6,638,547.

(60) Provisional application No. 60/332,434, filed on Nov. 16, 2001.

(51) Int. Cl.
*A23D 9/007* (2006.01)
(52) U.S. Cl. ...................................... 426/611; 426/607
(58) Field of Classification Search ................. 426/601, 426/611, 607
See application file for complete search history.

(56) References Cited

U.S. PATENT DOCUMENTS

| | | | |
|---|---|---|---|
| 6,491,952 B1 | 12/2002 | Sjoberg | |
| 6,638,547 B2 * | 10/2003 | Perlman et al. | 426/2 |
| 6,998,501 B1 | 2/2006 | Wright et al. | |
| 7,144,595 B2 * | 12/2006 | Perlman et al. | 426/611 |
| 7,575,768 B2 | 8/2009 | Perlman et al. | |

FOREIGN PATENT DOCUMENTS

| | | | |
|---|---|---|---|
| WO | WO 99/43218 | * | 9/1999 |
| WO | WO 00/04887 | | 2/2000 |
| WO | WO 01/32029 | * | 3/2000 |
| WO | WO 03/043433 | | 5/2003 |

OTHER PUBLICATIONS

PCT International Search Report for International Application No. PCT/US06/034776 dated Jun. 24, 2006.
U.S. Office Action for U.S. Appl. No. 11/222,512 dated Aug. 12, 2008.
U.S. Office Action for U.S. Appl. No. 11/222,512 dated Dec. 30, 2008.
U.S. Notice of Allowance for U.S. Appl. No. 11/222,512 dated Apr. 9, 2009.
U.S. Notice of Allowance for U.S. Appl. No. 11/222,512 dated May 19, 2009.

* cited by examiner

*Primary Examiner*—Carolyn A Paden
(74) *Attorney, Agent, or Firm*—Foley & Lardner LLP

(57) ABSTRACT

A dietary supplement is provided which includes at least one triglyceride-based edible fat and between 3% and 50% by weight of triglyceride recrystallized phytosterols. The dietary supplement can be in the form of a capsule, pill or wafer. Additionally, the dietary supplement can be combined with protein, vitamins, minerals, or combinations thereof.

4 Claims, No Drawings

PREPARED FOODS CONTAINING TRIGLYCERIDE-RECRYSTALLIZED NON-ESTERIFIED PHYTOSTEROLS

CROSS-REFERENCE TO RELATED PATENT APPLICATIONS

This application is a continuation of U.S. application Ser. No. 10/677,634, filed Oct. 1, 2003, now U.S. Pat. No. 7,144,595, which in turn is a continuation-in-part of PCT Application PCT/US02/36809, filed Nov. 14, 2002, and a continuation-in-part of U.S. application Ser. No. 10/295,929, filed Nov. 14, 2002, now U.S. Pat. No. 6,638,547, which claim the benefit of U.S. Provisional Application No. 60/332,434, filed Nov. 16, 2001, each of which is incorporated herein by reference in its entirety, including all figures and tables.

BACKGROUND OF THE INVENTION

The present invention relates to prepared foods, such as fried snack foods, fortified with non-esterified phytosterols delivered in fats or oils that are essentially free of emulsifiers and the like, and to the utility of such phytosterols for stabilizing heated fats and oils against oxidation, as well as to the surprising bioavailability of triglyceride-recrystallized phytosterols in such foods, for decreasing plasma cholesterol levels in mammals.

It has been a widely held belief that to obtain appreciable benefit from phytosterols, i.e., either plant sterols, stanols, or combinations thereof [including beta-sitosterol, beta-sitostanol, campesterol, campestanol, stigmasterol, stigmastanol, brassicasterol, brassicastanol, clionasterol and clionastanol (collectively termed phytosterol or phytosterols)] for lowering plasma cholesterol, the phytosterol should be dissolved in an edible oil or other solvent so that it can enter micelles in the small intestine to inhibit the absorption of cholesterol.

This belief has been supported by early research carried out in the 1950s through the 1970s showing that large doses of phytosterols in their solid form, i.e., coarse powders, were required to achieve meaningful decreases in plasma cholesterol levels. For example, in 1956, Faquhar et al., (*Circulation*, 14, 77-82, 1956) showed that doses of 12-18 g per day of beta sitosterol (provided in divided doses) were required to achieve a 15-20% lowering of serum cholesterol in males with atherosclerosis. In another study, 9 g per day (3 g t.i.d.) of soybean-derived phytosterols were required to lower plasma cholesterol approximately 9% (Kucchodkar et al., *Atherosclerosis*, 23, 239-248, 1976). In yet another study, 3-9 g per day of tall oil-derived phytosterols were required to lower plasma cholesterol approximately 12% (Lees et al., *Atherosclerosis*, 28: 325-333, 1977). In a recent study, 1.7 g per day of finely powdered tall oil-derived phytosterols were sufficient to lower total plasma cholesterol by 9% and LDL-cholesterol by about 15% (Jones et al., *Am J. Clin Nutr*, 69: 1144-1150, 1999).

It has been generally appreciated that phytosterols such as alpha and beta sitosterol, stigmasterol, campesterol, and the corresponding saturated (chemically reduced or hydrogenated) "stanol" species, are insoluble in water, and only slightly soluble in edible oils. Accordingly, to promote the solubilization of phytosterols, and their efficacy in lowering plasma cholesterol, U.S. Pat. No. 6,025,348 by Goto et al. describes the incorporation of at least 15% and as much as 70% by weight or more of a polyhydric alcohol/fatty acid ester (including glycerol fatty acid esters containing at least two esterified and at least one unesterified hydroxyl group such as diacylglycerols or diglycerides), into a fat. Between 1.2% and 4.7% by weight of phytosterol is incorporated into the polyhydric alcohol/fatty acid ester containing fat composition.

U.S. Pat. No. 6,139,897 by Goto et al. describes an oil or fat composition containing 80% or more diacylglycerol and up to 20% phytosterol. The high proportion of diacylglycerol assures solubility or dispersal of the phytosterol to provide a cholesterol-lowering fat substitute.

U.S. Pat. No. 5,998,396 by Nakano et al., describes an edible oil containing a phytosterol, vitamin E, and an emulsifier rendering the phytosterol soluble in both the vitamin E and the edible oil.

U.S. Pat. No. 5,419,925 by Seiden et al. describes a reduced calorie fat composition based upon a substantially non-digestible polyol fatty acid polyester plus reduced calorie medium chain triglycerides and other reduced calorie fats or noncaloric fat replacements including plant sterol esters that are soluble in such fat compositions. Free fatty acids, vitamin E and tocotrienol have each been utilized by other inventors to promote the solubilization of phytosterols in fats and oils, with the expectation that the cholesterol lowering properties of various phytosterols would be improved.

U.S. Pat. No. 5,244,887 by Straub describes the preparation of a cholesterol-lowering food additive composition with plant stanols, including: (i) an edible carrier such as an oil, monoglyceride, diglyceride, triglyceride, tocopherol, alcohol or polyol, (ii) an antioxidant and (iii) a dispersant or detergent-like material such as lecithin, or other phospholipids, sodium lauryl sulfate, a fatty acid, salts of fatty acids, or a fatty acid ester. Straub cites research showing that 1.5 grams per day of a stanol mixture derived from soybean sterols lowered blood cholesterol by 15% after 4 weeks of therapy, and believes that these stanols are preferred to sterols based upon less stanol absorption from the G.I. tract and better heat stability in air than sterols.

U.S. Pat. No. 5,932,562 by Ostlund, Jr. describes an aqueous micellar mixture of plant sterol and lecithin (in a 1:1 to 1:10 mole ratio) which has been dried to a water soluble powder and which is useful as a food additive for reducing cholesterol absorption.

U.S. Pat. No. 4,195,084 by Ong describes a taste-stabilized pharmaceutical suspension of sitosterols to reduce hypercholesterolemia, in which the suspension includes the plant sterol, a chelator such as calcium disodium EDTA, a surfactant and other ingredients to assure suspension and dispersal of the phytosterol.

U.S. Pat. No. 3,881,005 by Thakkar et al. describes a pharmaceutical dispersible powder for oral administration in which sitosterols are combined with any one of a variety of excipients, and any one of a variety of pharmaceutically acceptable surfactants.

U.S. Pat. No. 6,267,963 by Akashe et al. describes a plant sterol/emulsifier complex that has a lower melting temperature than the plant sterol alone. The complex, e.g., a co-crystallized monoglyceride and plant sterol mixture, is said to facilitate incorporation of the sterol into food products without adversely affecting the texture of the food products.

As indicated above, it has been widely believed that increasing the solubility of phytosterols in fat increases their bioavailability and reduces the dose required to achieve a specified degree of cholesterol reduction. Thus, U.S. Pat. No. 5,502,045 by Miettinen et al., describes the preparation and use of the plant stanol, beta sitostanol, in the form of a fatty acid ester which is readily soluble in an edible oil, to reduce the serum cholesterol level in humans. This technology has been utilized in manufacturing the margarine product marketed under the tradename Benecol®.

U.S. Pat. Nos. 6,031,118 and 6,106,886 by van Amerongen et al. describe similar stanol fatty acid esters but provide different and reportedly improved chemical methods for their preparation. Plant sterols (from soybean oil) have also been interesterified with fatty acid esters to produce the margarine marketed under the tradename Take Control®. Clinical studies suggest that with mildly hypercholesterolemic individuals, dietary intake of between 1.5 and 3 grams per day of the free phytosterol (provided in a fatty acid esterified form) is required to decrease plasma cholesterol approximately 15%.

U.S. Pat. No. 5,932,562 by Ostlund, Jr. points out that cholesterol is absorbed from an intestinal micellar phase containing bile salts and phospholipids which is in equilibrium with an oil phase inside the intestine. Prior to recent experiments, delivery of phytosterol as a solid powder or aqueous suspension was thought to not be preferred because of the limited rate and extent of solubility in intestinal liquid phases. In fact, at least two earlier human studies showed that as much as 9-18 grams of sitosterol per day were required to decrease the plasma cholesterol level by approximately 15% when the sitosterol was provided in a coarse powdered (rather than soluble) form. Yet, esterification of phytosterols, coupled with the use of edible oils to deliver these sterols is not always practical, e.g., in formulating fat-free foods. It is in this context that Ostlund, Jr. provides a water-dispersible mixture of plant sterol and lecithin.

Using a finely milled powdered form of free phytosterols (from tall oil) suspended in a margarine (not fully dissolved or recrystallized in fat), Jones et al. have described cholesterol reduction in hypercholesterolemic humans (Jones et al., *Am J Clin Nutr* 69:1144-1150, 1999) and other mammals (Ntanios et al., *Atherosclerosis*, 138:101-110, 1998; Ntanios et al., *Biochim Biophys Acta*, 1390:237-244, 1998). In these studies, the efficacy based on cholesterol reduction appears to be equal to that of phytosterol and stanol esters reported by others.

Still another method of producing a fine suspension of microparticulate phytosterols in fat and water has been described by Yliruusi et al. in PCT International Publication Number WO 99/43218. The method involves first heating and dissolving beta-sitosterol in a fat or oil, and then precipitating the phytosterol with water to form a homogenous microcrystalline suspension. While this process appears more cost-effective than grinding, emulsification of fat with water causes any fat to become susceptible to oxidation and necessitates refrigeration.

The production of microparticulate phytosterols described in the prior art involves increased cost and inconvenience, e.g., the use of grinding, and can result in a mixed emulsified product that is more susceptible to oxidation and rancidity, particularly when an aqueous fat-phytosterol emulsion is involved. In fact, there are limitations and disadvantages inherent in most of the above prior methods of phytosterol preparation and delivery. These methods have included grinding, formation of fat and water mixed phytosterol emulsions, chemical modification of phytosterols, e.g., esterification, and mixing of phytosterols with substantial amounts of specialized solubilizing and dispersing agents.

A recent review article entitled "Therapeutic potential of plant sterols and stanols" (Plat et al., *Current Opinion in Lipidology*, 11:571-576, 2000) has summarized the results of a number of independent clinical studies in which human plasma cholesterol levels were monitored before and after ingestion of food products enriched with plant sterols and sterol esters (approximately 2-2.5 g per day). The authors conclude that LDL cholesterol levels decreased significantly, i.e., an average of 10-14%.

The description above is provided to assist the understanding of the reader, and does not constitute an admission that the cited references are prior art to the present invention.

SUMMARY OF THE INVENTION

The present invention concerns the use of non-esterified phytosterols in fortifying fat-containing prepared foods. Non-esterified phytosterols were found to have the unexpected property of decreasing the oxidation of fats used in prepared foods, particularly when the fats are heated and become particularly susceptible to oxidation. It is believed that soluble phytosterols e.g., the heat-solubilized non-esterified phytosterols described herein, are also able to protect polyunsaturated fatty acid moieties in fats by quenching, i.e., scavenging, oxidative free radicals and/or peroxides and hydroperoxides that are formed during fat oxidation, and that are particularly problematic in heated fats.

Thus, in addition to functioning as a plasma cholesterol-lowering neutraceutical ingredient in prepared foods, phytosterols can actually protect fats against oxidation during cooking and storage. These two different and compatible functionalities each support the novel introduction of phytosterols into fat-based compositions or fat-containing prepared foods, e.g., into frying and baking shortenings that are absorbed (e.g., into potato chips) or otherwise incorporated into such prepared foods.

Heat-solubilizing non-esterified phytosterols in fat or oil, followed by cooling and recrystallization, results in formation of triglyceride-recrystallized non-esterified phytosterols (TRPs). The inventors have found that when ingested, regardless of the crystalline size of these fat-recrystallized phytosterols, they were effective at reducing mammalian plasma cholesterol levels. By using cost-effective non-esterified phytosterols, and rendering them bioavailable by thermal recrystallization in fat (i.e., heating and cooling in the frying fat or in the recipe ingredient fat), the invention provides an effective alternative to using more costly forms of phytosterols for lowering plasma and liver cholesterol levels. Such more costly phytosterols include microparticulate powders (ultrafine micron-sized phytosterol powders), chemically modified fat-soluble phytosterols, e.g., fatty acid-esterified phytosterols, emulsified phytosterols, and the more perishable water-oil microparticulate suspensions of phytosterols. Underlying this new method for utilizing phytosterols is the discovery that although a chemically unmodified phytosterol (such as beta-sitosterol) is insoluble in water and poorly soluble in fat, it need not be converted to a microparticulate powder to be effective at reducing plasma cholesterol levels in vivo.

Accordingly, in a first aspect, this invention provides a prepared food product for ingestion by mammals, e.g., by humans. The food product includes an oxidation-resistant fat-based composition substantially free of exogenous solubilizing and dispersing agents for phytosterols. This fat-based composition includes between 75% and 98% by weight of at least one triglyceride-based edible oil or fat, and between 2% and 25% by weight of non-esterified tryglyceride-recrystallized phytosterols (TRPs). At room temperature a limited amount of phytosterol will solubilize, typically such that a fat will include approximately 1.5% by weight of the phytosterols in solution, with any remaining phytosterols remaining insoluble. Thus, if phytosterols are added to the fat to a level from 2% to 25% by weight at room temperature, the fat composition will contain approximately 1.5% solubilized phytosterol and between 0.5% and 23.5% by weight of the phytosterols will remain insoluble at that temperature. Typically the fat-based composition has been partially oxidized by an interval of exposure to air during the manufacture and storage of the prepared food product, and contains a reduced amount of oxidative by-products compared to a similar fat-based composition lacking these non-esterified phytosterols.

Storage stability of the food product may also be referred to as the shelf-life of the product at ambient temperatures. Depending upon the food packaging materials and inert gases utilized in the packaging process, the shelf life for such products may range from approximately one week to a year or more. This fat-based composition has been shown to be cholesterol-reducing as measured in the plasma of mammals, and the TRPs when ingested, are essentially as effective, i.e., as bioavailable, as fat-soluble esterified phytosterols in lowering plasma cholesterol levels. Preferably the shelf-life of a prepared food product containing TRPs is increased at least 5%, 10%, 20%, 30%, 50%, 100%, or even more compared to an otherwise equivalent food product not containing the TRPs.

In particular embodiments, the fat composition includes phytosterols at a level of 2-5%, 5-10%, 10-15%, 15-20%, or 20-25%. In some cases even higher levels may be added.

In a related aspect, a prepared food product for ingestion by mammals is provided as above except that the fat-based or fat-containing composition has been partially oxidized by an interval of heating, e.g., frying, baking, cooking and the like, in air, and contains a reduced amount of oxidative by-products compared to a similar fat-based composition lacking said non-esterified phytosterols. An upper limit for the interval of heating in air has not been established. However, it is believed that any duration of heating of a conventional fat (one that is free of phytosterols) that results in an acceptable (not excessive accumulation of oxidative by-products, (such as free fatty acids and conjugated dienes), will be satisfactory for the phytosterol-fortified fat. For example, fats and vegetable oils may be exposed to temperatures of approximately 180° C. during deep fat frying for periods of time ranging from 5 hr to 25 hr while the prepared food cooked in the oil is exposed to such heat for much shorter intervals, e.g., during cooking (typically several minutes rather than several hours). In any event, a prepared food product as described above may be fried, baked or otherwise heated at least for a time period and to a temperature at least sufficient to dissolve a desired amount (preferably all) of the non-esterified phytosterols added to the fat portion of the fat composition. The fat composition is substantially free of exogenous phytosterol-solubilizing and dispersing agents. Phytosterol enrichment of the fat composition decreases the amount of polar and other oxidative by-products accumulated in the fat and in the prepared food during heating and exposure to air. At least a portion of the non-esterified phytosterols in the fat composition are converted by heating, fully dissolving and subsequent cooling, to triglyceride-recrystallized phytosterols, i.e. TRPs, in which the TRPs contained in the fat composition and in the prepared food product are bioavailable when ingested, to reduce mammalian plasma cholesterol levels.

In certain embodiments, the amount of the edible fat composition in the prepared food product is between 10% and 75% by weight of the food product, e.g., 10-20%, 20-30%, 30-40%, 40-50%, 50-60%, or 60-75%. In other embodiments, the amount of the edible fat composition in the prepared food is lower or higher, e.g., 1-5%, 2-5%, 3-5%, or 4-5%.

In preferred embodiments, the TRPs are formed by heating at least the fat-based composition (or heating the prepared food product as it contains the fat-based composition) to a temperature of greater than 60° C., and fully dissolving the non-esterified phytosterols in the fat composition, and subsequently cooling this composition to room temperature to allow the TRPs to crystallize and be formed.

In another related aspect, a prepared food product for ingestion by mammals is provided that includes a plasma cholesterol-reducing oil or fat composition with improved resistance to oxidation. The oil or fat composition is substantially free of exogenous solubilizing and dispersing agents for phytosterols, and includes between 75% and 95% by weight of at least one triglyceride-based edible oil or fat, and at least 5% by weight of non-esterified triglyceride-recrystallized phytosterols. As described above, typically the phytosterols are soluble in the oil or fat composition at room temperature to a level of approximately 1.5% by weight, so that at least 3% by weight of phytosterols are insoluble at room temperature and have been converted by heating, fully dissolving, and cooling to form triglyceride-recrystallized phytosterols, i.e., TRPs. These TRPs, when ingested, are essentially as effective as fat-soluble esterified phytosterols in lowering plasma cholesterol levels in mammals.

In preferred embodiments, the oil or fat composition includes at least 8%, 10%, 12%, 15%, 17%, or 20% by weight of non-esterified phytosterols or is in a range defined by taking any two of those values as endpoints of the range. As described above, typically the phytosterols are soluble in the fat or oil at room temperature to a level of approximately 1.5% by weight, and the remainder (e.g., at least 6.5%, 8.5%, 10.5%, 12.5%, 15.5%, or 17.5% respectively) is insoluble at room temperature, but is dissolved and tryglyceride-recrystallized by heating to dissolve the phytosterols and cooling. These TRPs, when ingested, are essentially as effective as fat-soluble esterified phytosterols in lowering plasma cholesterol levels in mammals.

In preferred embodiments, the TRPs described above are formed by heating at least the above referenced oil or fat composition (or a prepared food product containing the oil or fat composition, or the oil or fat and the phytosterols as ingredients of the prepared food) to a temperature of greater than 60° C., fully dissolving the non-esterified phytosterols in the composition, and subsequently cooling the composition to room temperature to cause the TRPs to be formed.

In certain embodiments, prepared food products are selected from the group consisting of margarine, frying and baking shortenings, mayonnaise, salad dressing, filled dairy products, nut, seed and kernel butters and chocolate (containing cocoa butter). In each of these examples, the phytosterols are dissolved by heating them in the fat portion of these prepared foods, i.e., heating without any aqueous components present. In other embodiments, the prepared food product is a pastry or cake.

In certain embodiments, the prepared food product is fried, baked, or otherwise heat-processed with the oil or fat composition, and/or where the oil or fat composition and phytosterols are added as ingredients in the preparation of the prepared food, wherein such heating allows a portion of non-esterified phytosterols that is insoluble in the oil or fat composition at room temperature to be solubilized and thereby enter and be incorporated into the food product, whereupon during cooling, TRPs are formed in the food product.

In preferred embodiments, the prepared food product is selected from the group consisting of potato chips, French fries, corn chips, tortilla chips, popcorn, and crackers.

Also in preferred embodiments, the food product is cooked, baked, or otherwise heat-processed with the above-described oil or fat composition, allowing a portion of nonesterified phytosterols that is insoluble in the composition at room temperature to be solubilized. During subsequent cooling to room temperature and crystallization of non-esterified phytosterols, a partial or complete solidification of the oil or fat composition can occur. This solidification decreases the oiliness, particularly the surface oiliness, perceived by hand contact with the food product compared to the same food product prepared without non-esterified phytosterols (due to the formation of TRPs in the fat or oil). Solidification or "hardening" of oil can also reduce or prevent oil separation in certain prepared foods, and is particularly useful in such foods as peanut butter, soybean butter, sesame seed butter and other seed, bean and nut kernel butters. "Hardening" of an edible oil may be compared to that resulting from partial hydrogenation of vegetable oils. Both modifications tend to solidify a vegetable oil by increasing the oil's melting temperature. However, from a nutritional perspective, addition of phytosterols to ones diet advantageously decreases the level of plasma LDL cholesterol, while addition of partially hydrogenated oils disadvantageously increases the LDL level.

In preferred embodiments, the food product, and more particularly the oil or fat composition within the food product, when heated in air, is more resistant to oxidation and formation of chemically polar degradation products than the same product lacking the non-esterified phytosterols, e.g., as described in Example 3 below.

In preferred embodiments, the food product incorporating the oil or fat composition has a reduced calorie content compared to a similar food product prepared without non-esterified phytosterols, owing to the presence of the non-esterified phytosterols that are calorie-free, and substitute for a portion of triglyceride-based oil or fat normally absorbed or otherwise incorporated into the food product. This statement is explained and supported by Example 4 below.

In preferred embodiments, the non-esterified phytosterols are selected from the group consisting of tall oil-derived phytosterols (such as those obtained from the manufacture of wood pulp from pine trees) and vegetable oil-derived phytosterols (such as those derived from soybean oil).

In another aspect, the invention provides an oxidation-resistant frying or baking shortening that includes: (a) from 75% to 98% by weight of at least one edible triglyceride-based fat or oil; and (b) from 2.0% to 25% by weight TRPs (produced from at least one non-esterified phytosterol compound being solubilized by heating, and allowed to recrystallize in the fat or oil upon cooling). As explained above, typically from 0.5% to 23.5% by weight of phytosterols are recrystallized in the solid phase, and approximately 1.5% by weight of non-esterified phytosterol remains solubilized in the fat at room temperature.

Highly preferably the shortening is substantially free of exogenous solubilizing and dispersing agents for phytosterols, and the rate of formation of polar oxidation products upon heating the shortening to between 160° C. and 190° C. is reduced, compared to the same shortening lacking the at least one non-esterified phytosterol compound.

Referring to this aspect, the formation of polar oxidation products was determined by measurement of the dielectric constant of the shortening after two hours of heating as described elsewhere herein (see Example 3, second experiment). The term "reduced," referring to the rate of formation of polar oxidation products, indicates that the increase in dielectric constant of the shortening is reduced at least 5%, and preferably 7, 8, or 10% or more for the phytosterol-supplemented shortening, compared to the non-supplemented shortening.

In preferred embodiments, the oxidation-resistant frying or baking shortening includes at least one edible triglyceride-based fat or oil selected from the group consisting of natural vegetable oils or fats, natural animal fats and oils, structurally rearranged or modified vegetable and/or animal fats, and combinations thereof.

In preferred embodiments, the oxidation-resistant frying or baking shortening includes at least one non-esterified phytosterol compound selected from the group consisting of vegetable oil-derived phytosterols, tall oil-derived phytosterols, and combinations thereof.

In preferred embodiments, the oxidation-resistant frying or baking shortening includes at least one non-esterified phytosterol selected from the group consisting of beta-sitosterol, beta-sitostanol, campesterol, campestanol, stigmasterol, stigmastanol, brassicasterol, brassicastanol, clionasterol and clionastanol, and combinations thereof.

In another aspect, the invention features a method for reducing plasma cholesterol levels in mammals. The method includes providing a heat-processed prepared food containing an edible fat-based composition that includes between 75% and 98% by weight of at least one triglyceride-based edible fat, and between 2% and 25% by weight of non-esterified triglyceride-recrystallized phytosterols, for ingestion by the mammal(s). Generally, the phytosterol is soluble to a level of approximately 1.5% by weight, such that the insoluble phytosterols in the fat-based composition at room temperature consititute between 0.5% and 23.5%. The fat-based composition is substantially free of exogenous phytosterol-solubilizing and dispersing agents. The insoluble phytosterols have been heat-solubilized and subsequently cooled to form triglyceride-recrystallized phytosterols i.e., TRPs. The TRPs when ingested are essentially as effective as fat-soluble esterified phytosterols in reducing plasma cholesterol levels.

In preferred embodiments, the proportion of non-esterified phytosterols used in the edible fat-based composition for a prepared food is between 3% and 15% by weight of the composition, and more preferably between 5 and 10% of the composition (or other percentage as described for food products herein). Thus, with the latter range, a serving of food containing 10 grams of a fat-based composition, would contain between 0.5 g and 1.0 g of non-esterified phytosterols. This amount is consistent with current recommendations published by the U.S. Food and Drug Administration.

The edible fat-based composition is heated to a temperature of greater than 60° C., and preferably between 75° C. and 150° C., or higher, to dissolve the non-esterified phytosterols in the composition. At a temperature of 60° C. or below, the rate of dissolution is slower than desirable, and the concentration of dissolved phytosterols in a fat-based medium is lower than generally desired to be commercially useful or practical.

In preferred embodiments, between 0.5 g and 4.0 g of the non-esterified phytosterols contained in the above prepared food are ingested daily by humans.

In preferred embodiments, the TRPs are formed by heating at least the edible fat-based composition to a temperature exceeding 60° C. for a period of time sufficient to dissolve the non-esterified phytosterols in the fat, and subsequently cooling the composition (or the food containing this composition) to room temperature to cause the TRPs to be formed.

In a related aspect, the invention features a method for reducing plasma cholesterol levels in mammals, including providing and regularly ingesting a heat-processed prepared food containing an edible fat-based composition that contains between 75% and 97% by weight of at least one triglyceride-based edible fat, and at least 3% by weight of non-esterified triglyceride-recrystallized phytosterols. Typically the phytosterols are soluble in the fat at a level of approximately 1.5% and the remainder (e.g., 1.5% from a total of 3%) is insoluble at room temperature. The fat-based composition is substantially free of exogenous phytosterol-solubilizing and dispersing agents. The insoluble phytosterols are heat-solubilized and subsequently cooled to form triglyceride-recrystallized phytosterols, i.e., TRPs. The TRPs when ingested are essentially as effective as fat-soluble esterified phytosterols in reducing plasma cholesterol levels.

In certain embodiments, the fat composition contains at least 5%, 7%, 10%, 12%, 15%, 17% or 20% by weight of non-esterified phytosterols (typically the phytosterols are soluble to a level of approximately 1.5% at room temperature and the remainder is insoluble).

In another aspect, a method is provided for preparing a TRP-containing fat-based composition. The method includes (i) providing a triglyceride-based edible fat-containing composition that includes between 2% and 25% by weight of non-esterified phytosterols and not more than 98% by weight of edible fat or oil, in which the composition is substantially free of exogenous phytosterol-solubilizing and dispersing agents, (ii) heating the composition to dissolve (preferably fully dissolve) the non-esterified phytosterols, and, (iii) cooling the composition to room temperature, allowing formation of TRPs. Typically the phytosterols are soluble in the edible fat or oil at room temperature to a level of approximately 1.5%, while the remainder is insoluble at room temperature. In general the fat-containing composition is heated to a temperature of 60-180° C., usually 75-150° C.

Similarly, in a related aspect the invention concerns a method of preparing a TRP-containing fat-based composition by heating a mixture of a triglyceride-based edible fat-containing composition, and non-esterified phytosterols, where the mixture includes not more than 98% by weight of edible fat or oil and 2% to 25% by weight of non-esterified phytosterols for sufficient time and temperature to dissolve said non-esterified phytosterols, and cooling the composition to room temperature.

In yet another aspect, a method is provided for preparing a non-esterified phytosterol-fortified prepared food. The method includes: (i) providing an edible fat-based composition that includes between 2% and 25% by weight of non-esterified phytosterols and between 75% and 98% by weight of at least one edible fat or oil, in which the composition is substantially free of exogenous phytosterol-solubilizing and dispersing agents, and one or more other ingredients for the prepared food if any such additional ingredients are used; (ii) cooking or otherwise heating the prepared food ingredients with the composition to allow the non-esterified phytosterols to dissolve in the oil or fat and enter or become integrated into the food product; and (iii) cooling the food product to room temperature to allow formation of TRPs in the composition within the prepared food.

In certain embodiments, the fat-based composition can be used as an ingredient mixed with other ingredients in the preparation of the prepared food, and/or the prepared food product can be cooked in the fat-based composition.

While in most cases the non-esterified phytosterols are recrystallized in the oil or fat prior to combining with other ingredients, for some prepared foods, the phytosterols can be combined with the oil or fat in preparation of the prepared food. Thus, alternatively, the fat or oil and the phytosterols can be added as separate ingredients in such manner that the phytosterols will dissolve in the fat or oil upon heating of the combined ingredients. In some cases, only a portion of the phytosterols added as ingredients will become solubilized, e.g., where only a portion of the phytosterols are in contact with the fat or oil during heating. In cases where the fat-based composition, or the oil or fat and the phytosterols are added as ingredients in preparing the prepared food, typically a number of different ingredients are blended or mixed such that the various ingredients are relatively uniformly distributed throughout the mixture.

Another aspect concerns a method of increasing the oxidative stability of a heated frying fat composition, where the method involves maintaining a fat composition that contains at least 8% by weight non-esterified phytosterols at a temperature of at least 100 degrees C., wherein said fat composition is used for frying.

The frying fat composition can be held at the elevated temperature for a suitable length of time considering the purpose, e.g., at least 0.5 hr, 1 hr, 2 hrs, 4 hrs, 6 hrs, 8 hrs, 10 hrs, or longer. Of course, as with any frying fat composition, eventually the fat will degrade sufficiently that it will not be used any longer for frying, and may be replaced with fresh fat composition. In particular embodiments, the fat composition oxidizes at a rate that is only 90, 80, 70, 60, 50, 40, 30, 20% or even less of the rate for the same fat composition without phytosterols or other non-fat oxidation rate reducing components.

In the particular embodiments, the fat composition containing non-esterified phytosterols is a composition as described for other aspects herein.

Yet another aspect concerns a dietary supplement that includes at least one triglyceride-based edible fat, and between 3% and 50% by weight of triglyceride recrystallized phytosterols. Such a dietary supplement can also be regarded as a nutraceutical. The supplement can be in numerous different forms, e.g., capsule, pill, wafer. The TRP-fat composition can be combined with other dietary components, such as protein, vitamins, minerals, and combinations of such components.

In certain embodiments, the phytosterol content, fat content, preparation method for the composition, and other parameters are as described herein for other aspects involving a fat/TRP composition.

The term "prepared" in the context of a "prepared food product" refers to a commercially processed and packaged food product containing multiple combined ingredients, in which the processing includes at least one step in which the assembled food product (or one or more triglyceride-based fat or oil ingredients that are either contacting, or being combined into the food product), are heated together with a suitable quantity of phytosterol ingredient(s), to a temperature sufficient to dissolve the phytosterols in the fat or oil, and often substantially higher than this temperature, and for a period of time sufficient to process, cook, fry or otherwise complete the heat-preparation of the food product. Upon cooling, a portion of the phytosterols recrystallize in a fat or oil component of the processed prepared food product. Examples of such prepared food products include potato chips (containing at least potatoes, frying fat or oil, and phytosterols), French fries, corn chips, tortilla chips, popcorn, crackers, peanut butter, soybean butter, sesame seed butter and other nut kernel butters, mayonnaise, processed cheese, chocolate and the like.

The term "fat" may be used broadly and generally, referring to an edible triglyceride that may be either liquid (also specifically termed oil) or solid at room temperature (also specifically termed fat), and that is derived from a single vegetable source (e.g., soybean, cottonseed, corn) or an animal source (beef tallow, pork lard) or a blended combination of sources. Unless specifically limited to edible triglyceride compositions that are solid at room temperature, use of the term "fat" includes oils. Also unless clearly indicated to the contrary, the term "fat" also includes chemically and enzymatically modified triglyceride-based liquid and solid fats and blends thereof (e.g., hydrogenated, partially hydrogenated, chemically or enzymatically interesterified, or assembled, i.e., "structured" triglycerides and combinations thereof.

The phrase "improved resistance to oxidation" for a fat that contains non-esterified phytosterols refers to a fat exhibiting at least a 10% reduced rate of degradation by oxidation in air, compared to oxidation of the same fat without phytosterols. This differential oxidation rate is particularly evident during heating of the oil, e.g., frying with the oil at a temperature of 160-190° C. Oxidation rate is evidenced by one or more physical measurements such as dielectric constant measurement of polar oxidation products formed in the fat, AOM (accelerated oxidation measurement, OSI (oxidative stability index), or organoleptic quality (tasting f or rancidity). The extent of oxidative protection provided by non-esterified phytosterols dissolved in fat heated to 180° C. is a function of the type of fat and the concentration of phytosterols in the fat. Improved resistance to oxidation is particularly evident in a vegetable oil containing polyunsaturated fatty acids, e.g., soybean, corn and canola oil. When 10% by weight soybean-derived phytosterols is dissolved in such oils, the rate of oxidation, i.e., formation of polar oxidation products, in the heated oils is at least 10% lower than the rate in the same oil lacking phytosterols. Preferably, the rate of oxidation is at least 20% lower, and more preferably, the rate is 30%, 40% or even 50% lower than the rate in the same oil lacking phytosterols.

The term "partially oxidized" refers to a fat-based composition that has been exposed to air either with or without heating, e.g., frying or baking and that has at least begun to accumulate oxidative by-products whose concentrations are measurable either in the oil or in the vapor above the oil by conventional means, e.g., by conductivity, dielectric constant, and free fatty acid content.

It is believed that oxidative protection of fats and oils provided by phytosterols has not been reported previously. Also, phytosterols are not recognized as antioxidants or as scavengers or quenchers of free-radicals or peroxides and hydroperoxides formed during oxidation of polyunsaturated fatty acid moieties. In searching for a rational explanation for this oxidative protection, Applicants have looked to literature describing various properties of cholesterol. Of course "cholesterol fortification" of a food product would be nutritionally undesirable and, indeed, phytosterol fortification is intended to reduce cholesterol uptake. However, the cholesterol molecule is structurally related to the phytosterols, i.e., addition of an ethyl side group to beta-sitosterol generates cholesterol. U.S. Pat. No. 6,214,534 by Horowitz et al. describes several UV light photodynamic quenchers including vitamins, thiols, cholesterol, and several other compounds that react with, and inactivate both free radicals and reactive forms of oxygen. Since free radicals, peroxides and hydroperoxides are produced during the oxidation of polyunsaturated fatty acid groups in triglycerides, phytosterols dissolved in fat may inactivate these reactive compounds, as with cholesterol described in the photodynamic system of Horowitz et al. While the phytosterols may act in this manner, the present invention is not limited by this explanation.

The term "edible" in the context of an oil or fat-based composition means that the composition is suitable for use in mammalian, e.g., human, foods, dietary supplements and pharmaceutical preparations.

The term "exogenous phytosterol-solubilizing and dispersing agents" refers to agents other than triglycerides in the prior art, that have been added to triglyceride-based oils and fats to promote the cholesterol-lowering efficacy of phytosterols (see discussion above in the Background section). A partial list of these agents includes monoglycerides, diglycerides, lecithin, vitamin E, the sorbitans and other surfactants, and fatty acids chemically esterified with phytosterols.

The term "substantially free," referring to any presence of exogenous solubilizing and dispersing agents for phytosterols, means that either zero percent, or in any event, less than 50% (and preferably less than 25%) of the amount of such an agent or agents that would be required in the absence of triglycerides, to achieve solubilization or dispersal of non-esterified phytosterols (at room temperature) that have been added to the referenced composition. Provided that the phytosterols are recrystallized in triglycerides, triglycerides alone are sufficient for phytosterol bioavailability, i.e., effectiveness in plasma cholesterol reduction. Therefore, any addition of such a non-triglyceride solubilizing or dispersing agent to a fat-based composition containing TRPs is considered gratuitous and optional.

The term "phytosterol" refers to any of a group of sterols derived from plants (see examples below in Example 1).

The term "non-esterified phytosterols" refers to forms of phytosterols that are free of ester chemical side chains. Conversely, esterified phytosterols are most commonly fatty acid-esterified phytosterols manufactured to promote phytosterol solubility in fat. Non-esterified phytosterols are defined herein to include both the non-esterified sterol and stanol forms of phytosterols (see Example 1 below). According to the present invention, phytosterols are dissolved in oil or fat before recrystallization, and therefore the particle size, texture, etc. of the material can be coarse for reasons of economy, i.e., chemical dissolution reduces the material to molecular dimensions. Dissolution of more costly forms of phytosterols, e.g., ultrafine micron-sized phytosterol powders, would be economically wasteful, but can also be done.

The composition which includes between 75% and 98% by weight of at least one triglyceride-based edible oil or fat, allows between 2% and 25% by weight of non-esterified phytosterols to be added to the same composition. A 3% to 10% by weight concentration range is a preferred range. Accordingly, at the 3% level, a food that contains 10 g of fat per serving will provide at least 0.3 g of phytosterols per serving. In the case of pharmaceutical preparations, the composition may include as little as 50% by weight of at least one triglyceride-based edible oil or fat, to allow between 3% and 50% by weight of non-esterified phytosterols to be added to the same composition.

The process of treating the non-esterified phytosterols by "heating, fully dissolving, and cooling" refers to a process that: (i) heats the phytosterols together with triglyceride-based fat or oil (and optionally other food ingredients constituting a prepared food product) to a temperature of greater than 60° C. until the phytosterols have dissolved, and then (ii) cooling the heated product and allowing the triglycerides to associate with the recrystallizing phytosterols. Flash-chilling with chilled air or with a chilled water jacket may tend to precipitate and segregate the phytosterols from the triglycerides, preventing optimal recrystallization. Conventional or normal ambient air cooling rates of prepared foods containing heated triglycerides and phytosterols is preferable to flash cooling. For example, in may cases cooling of a fat-based composition or prepared food to room temperature will occur over a period of 5 minutes to 2 hrs, although longer or shorter times can be used.

The term "triglyceride-recrystallized phytosterols" or TRPs and the process of heating and cooling these ingredients is described elsewhere herein. The term "recrystallized" is distinguished from the term "solubilized" (in which the phytosterols are dissolved to form a clear solution). Recrystallized is meant to indicate that the phytosterols after initially being dissolved in one or more triglyceride-based fats or oils, are allowed to cool and recrystallize in the oil or fat. By physical analyses (light microscopy of lipid stained crystals, and melting temperature determinations described elsewhere herein), Applicants have determined that such recrystallization results in fats and/or oils, i.e., triglycerides, becoming intimately associated with crystallizing phytosterols. The resulting products are mixed and/or interrupted crystal structures having melting temperatures reduced below that of the phytosterols alone. It is believed that these physically destabilized, triglyceride-containing crystals are more easily emulsified and/or dissolved in the mammalian gut, resulting in improved phytosterol bioavailability and therefore more effective plasma cholesterol reduction in vivo. As noted above, a proportion of the phytosterols is soluble in the fat at room temperature (typically at a concentration of about 1.5%). Therefore, when a combination of phytosterols and fat is heated to dissolve solidified (crystallized) phytosterols and then cooled, phytosterols that cannot remain in solution at room temperature solidify or recrystallize, but a portion remains dissolved in the fat. Thus, unless clearly indicated to the contrary, reference herein to "triglyceride-recrystallized phytosterols" or "TRPs" includes both the dissolved phytosterols as well as the re-solidified or recrystallized phytosterols.

The term "effective" refers to the extent to which plasma cholesterol levels in mammals are reduced by regular, e.g., daily, twice daily, or thrice daily ingestion of the recommended 1-2 gram dose (or the appropriate divided dose) of phytosterols. In a random population of human adults, a 5% to 15% or greater lowering of total cholesterol in the plasma caused by ingestion of phytosterols is considered effective.

The term "esterified phytosterols" refers to phytosterols (plant sterols and stanols) that have been joined through an ester linkage to fatty acids using a chemical, enzymatic, combination, or other process. The commercial margarines Benecol® and Take Control® discussed above, incorporate such esterified phytosterols. Therefore, "non-esterified phytosterols" refers to phytosterols that have not been esterified to fatty acids as described.

The term "reduced surface oiliness" means that upon routine handling of the prepared food, less oil is transferred from the food to ones hands (or to an absorbent surface) than would otherwise occur if the food were prepared with the oil or fat alone (see Example 5 below).

As used herein, the term "dietary supplement" refers to a preparation that is adapted to supplement an individual's diet by providing one or more dietary components. A "nutraceutical" refers to a product isolated or purified from foods, and generally sold in medicinal forms not usually associated with food and demonstrated to have a physiological benefit or provide protection against chronic disease. In the present invention, phytosterols provide a hypocholesterolemic benefit and are a nutraceutical.

For the definition of any other fat and oil-related terms that have not been defined herein, the reader is referred to the reference book, *Bailey's Industrial Oil and Fat Products*, Fourth Edition, Daniel Swern, editor, John Wiley & Sons, N.Y., 1979.

By "comprising" is meant including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

Additional aspects and embodiments will be apparent from the following Detailed Description and from the claims.

DETAILED DESCRIPTION OF THE PREFERRED EMBODIMENTS

Recently, a number of investigators have described a variety of methods for producing very small particles or microcrystals of phytosterols. It is believed that such small particles have greater efficacy in being dispersed in the GI tract and controlling plasma cholesterol levels. U.S. Pat. No. 6,129,944 by Tiainen et al. describes the production of a microcrystalline phytosterol product useful as a cholesterol-lowering agent, formed by pulverizing, i.e., dry or wet grinding, a crystalline phytosterol to produce microparticles having a preferred mean particle size of approximately 5-10 microns. The microcrystalline phytosterol product can be mixed with a sweetening agent and water or alternatively, mixed with another carrier such as fat to form a microparticulate emulsion. There is no suggestion by Tiainen et al. or any other investigator of which the inventors are aware that microcrystalline phytosterols after being formed, should be heated or dissolved in such a fat or oil. Such heating in oil, as described for the present invention, would be expected to destroy the sized microparticles described by Tiainen et al.

As described herein, phytosterols are recrystallized with triglycerides (e.g., vegetable oil, shortening, or the like). The first step involves heating the triglyceride(s) and phytosterol(s) until the phytosterols are dissolved. This phytosterol-triglyceride solution is used to contact, or be combined with the food product being fried, cooked or otherwise heated. (Alternatively, the fats and the phytosterols are added as separate ingredients in the preparation of a prepared food.) Subsequently, the prepared food product is cooled (preferably by contacting the heated food product with ambient air). Under the light microscope (600× magnification), it is seen that phytosterols that have been recrystallized in vegetable oil, e.g., soybean oil, tend to form a diversity of macrocrystalline structures spanning tens or hundreds of microns. This material when tasted, has a surprisingly soft and agreeable mouth feel, and includes elongated hexagonal crystals, radially extending branched crystalline needle structures (appearing as wispy ball-shaped structures), and large extended flat plate crystals. On the other hand, phytosterols that are recrystallized by quick-chilling to room temperature (e.g., by ice chilling to room temperature in a few seconds rather than by ambient air contact), tend to form harder, smaller, more homogeneous needle-like micro-crystals having diameters of only a few microns, i.e., 1-4 microns.

The temperature required to re-dissolve the above crystals in the surrounding vegetable oil differs significantly depending upon the rapidity of recrystallization. For example, 10% by weight soybean-derived phytosterols that were recrystallized at room temperature in soybean oil, redissolved in the oil at a temperature of 65° C. On the other hand, the more rapidly ice-recrystallized phytosterols described above required a higher temperature (72° C.) to be redissolved. By comparison, the same amount of phytosterol (as a dry powder) initially placed in soybean oil, required a temperature of nearly 85° C. to be dissolved. The observations on recrystallization (coupled with the microscopic analysis of crystalline sizes and shapes) suggested that slower recrystallization allows formation of mixed composition triglyceride-containing (larger) phytosterol crystals. These crystals would be expected to redissolve more easily, i.e., at a lower temperature, than the rapidly formed crystals.

To determine whether the larger crystals contained any triglycerides, these crystals were washed and centrifuged twice in ethanol. Next, the crystals were stained with a saturated Sudan Black solution (60% by weight ethanol in water) to visualize any lipids. Light microscopy confirmed that the lower melting point larger crystals (but not the higher melting point small needle-shaped crystals) contained multiple internal layers and occlusions of lipid. It is reasonable to conclude that the intimate association of triglycerides and phytosterols that results from fully dissolving and then recrystallizing phytosterols in fats, yields crystals having a reduced melting temperature. These crystals appear to provide dietary phytosterols in a highly bioavailable form useful for reducing plasma cholesterol levels.

While it has been recently reported that a crystalline complex can be formed by combining phytosterols and monoglyceride emulsifiers (see above, U.S. Pat. No. 6,267,963), the existence and utility of triglyceride-recrystallized phytosterols have not been previously described. In fact, Applicants have not found any prior reference to formation of a mixed crystalline complex or association between triglycerides and phytosterols that enhances phytosterol bioavailability.

Non-esterified phytosterols are known to have a very limited solubility (to a concentration of approximately 1.5% by weight) in an edible oil or fat at room temperature. Nevertheless, between 2% and 25% by weight of non-esterified phytosterols (e.g., semi-pure or purified phytosterols from soybeans or pine tree tall oils), can be readily and conveniently dissolved in edible oil or fat by heating to a temperature of 60° C. or greater, and preferably 75° C.-100° C. or above (the required temperature depending upon the concentration of phytosterols to be dissolved). Subsequently, as the heated composition is cooled to room temperature, a substantial portion of the solubilized phytosterol precipitates, i.e., is recrystallized, in the triglyceride-based oil or fat in the form of a Triglyceride-Recrystallized Phytosterol composition or complex (hereinafter abbreviated "TRP", "TRP composition or TRP complex").

Remarkably, the TRP composition formed in this manner has been found to be as potent in the mammalian diet at reducing the levels of plasma and liver cholesterol as fatty acid-esterified phytosterols that are fully soluble at room temperature. In the first direct comparison between non-esterified phytosterols and equivalent amounts of phytosterols as sterol esters in the same experiment, it was found that non-esterified phytosterols fully dissolved in oil by heating (>60 degrees C., and preferably >80 degrees C.), and provided equivalent (or even greater) reductions in plasma and liver cholesterol as compared to equivalent amounts of esterified sterols. In the context of cholesterol reduction, the term "greater" means that the cholesterol reductions measured and reported herein and in the Hayes reference are greater than those reported by Ntanios and Jones (*Biochim. Biophys. Acta* (1998) 1390:237-244) for the same levels of sterols, in which the sterols were incompletely dissolved in fat. While TRPs may have been accidentally produced in the past in the course of heating and cooling non-esterified phytosterols and fats, their utility for plasma cholesterol reduction would not have been recognized due to their poor room temperature solubility.

The presently described TRP composition is more convenient and cost-effective than esterified phytosterols or phytosterol-containing compositions that have been supplemented with solubilizers, emulsifiers, antioxidants and other additives for inclusion in foods. The TRP composition also has a significant advantage over the finely milled and microcrystalline powdered forms of phytosterols described by Tiainen et al. and Jones et al., in light of the considerable cost associated with producing these micron-sized powders. The present composition is particularly useful in preparing fat-based foods such as shortening, margarine, mayonnaise, salad dressing, peanut butter and the like, and processed food products including fried and baked snack foods.

Surprisingly, as illustrated below, the presence of dissolved phytosterols in a heated oil or fat, improves the triglyceride's oxidative stability, and at ambient temperature, decreases the surface oiliness of foods fried in the triglyceride-based composition. At the same time, the caloric fat content of a food prepared in or with the TRP-containing composition is reduced. While other investigators have found that finely milled or microcrystalline preparations of non-esterified phytosterols that have not been initially heat-solubilized in an oil or fat, can also function efficiently to reduce mammalian plasma cholesterol levels, the additional benefits described above are obtained only after heat-solubilization. For example, heat-solubilization in a triglyceride-based edible oil allows non-esterified phytosterols to freely enter a food product as it is being fried in the oil, whereas particles of phytosterols would be excluded. Likewise, suspended particles would not be expected to improve the oxidative stability of an oil.

For the purpose of this invention, the fat or oil used as a vehicle or carrier for the phytosterol herein, is a conventional triglyceride-based cooking fat or oil that is substantially free of phytosterol solubilizing agents, dispersants and/or detergents (collectively termed "oil emulsifiers or additives"). Examples of such fats and oils include natural vegetable oils, interesterified fats and oils, and partially hydrogenated vegetable oils, animal fats and combinations thereof.

Unlike recently described compositions for oils and fats containing phytosterols described above in the Background, the presently described triglyceride-based composition contains substantial amounts of insoluble phytosterol (recrystallized in fat) rather than solubilized phytosterol, and is substantially free of the above-described oil additives for dispersing or solubilizing phytosterols. The composition is particularly useful in preparing fat-containing foods that do not require oil transparency at ambient temperatures. This is true of margarines, shortenings, mayonnaise, cheese and other dairy fat-containing products, some salad dressings, and many other foods including processed foods that are fried, baked or otherwise prepared by cooking or heating in, or in combination with fat or oil. Examples of such foods include the snack food category, e.g., potato chips, crackers, and the bakery category, e.g., donuts, pies, cakes, and the like.

The present invention describes compositions and methods for introducing substantially fat-insoluble non-esterified phytosterols into foods, including snack foods, by means of the standard fat or oil that is used in the frying or baking of such foods. It was the inventors' intention to compare the efficacy of using non-esterified phytosterol preparations recrystallized in edible fat and used in foods, e.g., fried foods, with that of more costly diglyceride-solubilized or fatty acid esterified phytosterols in limiting cholesterol absorption in the gut, and lowering plasma cholesterol levels. Surprisingly, the phytosterols recrystallized in fat that has been incorporated into such foods are very effective, i.e., bioavailable, in reducing plasma and liver cholesterol levels. It is believed that this cholesterol-lowering efficacy compares favorably with that of fully solubilized phytosterol preparations (e.g., phytosterols esterified with fatty acids to assure solubility in fat-containing products such as Benecol® and Take Control® margarines).

As an unanticipated benefit and utility in the present invention, the presence of 5-10% or more by weight of phytosterol that has been recrystallized with triglycerides in the oil portion of fried snack food (e.g., potato chips) has been found to decrease the surface oiliness of fried food when compared to food fried in oil lacking the phytosterol. Applicants have also found that the presence of either soybean oil-derived phytosterols or tall oil-derived phytosterols in vegetable oil during frying, helps in chemically stabilizing the oil against oxidation by reducing the rate of appearance and the amount of polar breakdown products in the oil. To the extent that the phytosterols replace a portion of the oil in such a blend, the phytosterols also serve to reduce the caloric fat content of a food cooked in the blend. Thus, the present invention also provides methods for decreasing the surface oiliness of fried foods, and the resulting fried foods, and methods for providing reduced calorie food, utilizing TRPs as described herein.

Except for micron-sized finely milled powders of non-esterified phytosterols described by Tiainen et al. and Jones et al. (see above), as well as previously described emulsified preparations, the non-esterified phytosterols have been thought to lack "bioavailability" relative to esterified sterols and stanols, as emphasized in the introductory references. In this instance, bioavailability for a given quantity of phytosterol means the potency of that particular physical and/or chemical form of phytosterol in lowering the plasma level of total and LDL cholesterol. Despite the limited solubility of non-esterified phytosterols in fats and oils at room temperature, it has been discovered that concentrations of between 2% and 25% by weight non-esterified phytosterols (e.g., soybean oil-derived mixed prilled sterols or stanols or tall oil-derived sterols and stanols) can be conveniently and rapidly dissolved by mixing or other agitation in diverse oils, fats and fat-containing foods, e.g., cooking or salad oil, shortening, peanut butter and dairy cream, heated to a temperature of greater than 60° C., and preferably between 75° C. and 150° C., or above. At higher temperatures such as 180° C., a heated oil or fat, e.g., corn, canola, cottonseed, soybean oil, or palm oil that contains heat-solubilized phytosterols is useful in the preparation (e.g., frying and baking) of potato chips and other snack foods. When such heat-solubilized phytosterols are cooled and recrystallized in such fats or fat-containing foods, their ability to lower plasma cholesterol levels is excellent (see nutritional studies below).

The fat compositions and food products of the present invention can be prepared by conventional methods, with the addition of phytosterols (e.g., as described herein). Persons familiar with preparation of fat compositions and food products can routinely select suitable components for a particular product.

Preliminary Study. Reducing Plasma Cholesterol Using Non-Esterified Phytosterols and an Emulsifier in Dietary Fat.

The efficacy of adding 0.25% by weight soybean oil-derived prilled sterols and 0.25% soybean prilled stanols to a hamster diet containing 0.05% cholesterol to reduce the animal's plasma cholesterol level was investigated. Hamsters were fed a cholesterol-containing diet in which the dietary fat (30% soybean oil, 50% palm oil and 20% canola oil-providing approximately equal amounts of saturated, monounsaturated and polyunsaturated fatty acids) was either supplemented or unsupplemented with up to 6% by weight of an emulsifying agent (subsequently reported by Goto et al. in U.S. Pat. No. 6,139,897) to enhance the solubilization of sterols and stanols in the fat portion of the diet. It was expected that this agent, a mono- and diglyceride emulsifier (40% glyceryl monocleate +60% glyceryl dioleate), which readily dissolves both sterols and stanols, would enhance the ability of these phytosterols to lower hamster plasma cholesterol levels.

Surprisingly, each cholesterol-lowering regimen (i.e., sterols and stanols, each tested separately after heating with dietary fat; or stanols combined with either 3% or 6% by weight of the above emulsifier in the heated dietary fat) was found to reduce the plasma cholesterol level to the same extent. More specifically, while the plasma total cholesterol value (TC) in hamsters fed a cholesterol-supplemented diet was found to average 185 mg/dL, and the TC value in hamsters fed a cholesterol-free diet averaged 135 mg/dL, all of the dietary regimens incorporating a low level (0.25% by weight) of phytosterols (5:1 sterol-to-cholesterol) resulted in significantly reduced TC values averaging 160±15 mg/dL. (Liver EC, i.e., esterified cholesterol, showed that 1:3 monoglycerides improved efficacy, as well) These results suggested that phytosterols can function effectively to lower TC both when they are solublized in the diet (e.g., using mono- and diglycerides added to a dietary fat) and when they are recrystallized in the triglyceride (fat) portion of the diet, after being initially solubilized in the heated fat. It is also possible that finely milled micron-sized powder phytosterol preparations would function well to lower TC (without fat recrystallization), but these preparations have the disadvantage of greater manufacturing cost.

EXAMPLES

Example 1

Phytosterol Preparations and Solubilities in Cooking Oil

Two industrial samples of non-esterified phytosterols were used in a series of experiments described below. These samples included soybean oil-derived mixed prilled phytosterols and mixed prilled stanols (the latter prepared by fully hydrogenating the former). Both were obtained from ACH Food and Nutrition, Inc., Memphis, Tenn. The soybean oil-derived prilled phytosterols containing up to 4% by weight brassicasterol, 30% campasterol, 20% stigmasterol, and 40% beta-sitosterol.

The limit solubility of each phytosterol in cooking oil was measured by fully dissolving a graded series of concentrations (from 1% to 5% by weight, in steps of 0.5%) of each sample in soybean oil heated to 150° C., then cooling the samples to room temperature and waiting 24 hours for any supersaturating phytosterol to crystallize. All phytosterols appeared soluble in room temperature cooking oil at a concentration of 1.5% by weight, while all showed precipitates at concentrations of 2.0% and higher.

It is generally appreciated that at least 1-1.5 grams per day of phytosterol must be consumed by humans to achieve a useful decrease, e.g., a 5%-15% decrease, in the plasma cholesterol level. If one is to obtain this phytosterol dose in, for example, two 1 ounce servings of a food product rich in fat, e.g., a snack food containing 30% by weight fat, then the fat should contain approximately 7% by weight (or more) phytosterols (7% phytosterol×30% fat×56 g food=1.2 g phytosterol). With a limit solubility of approximately 1.5% in room temperature oil, most of this 7% level of phytosterol crystallizes in a conventional cooking oil or fat as it cools.

In the hamster, rabbit and human nutritional studies by Jones et al. and Ntanios et al. (cited above), non-esterified phytosterols provided in dietary fats caused a significant reduction in plasma cholesterol levels. Whether these phytosterols were simply suspended in the dietary fat as indicated in the rabbit and human studies, or alternatively, dissolved as suggested in the hamster study, (and described in the present invention), was investigated. Applicants prepared the coconut-olive-sunflower fat blend specified by Ntanios et al. in their hamster study, mixed it with the specified amount of tall oil-derived phytosterols (1 part by weight phytosterol and 5 parts by weight of the fat blend), and heated the resulting 17% by weight phytosterol suspension to 60° C., also as specified. After 4 hours heating, the suspension appeared unchanged, i.e., undissolved. It has been concluded that the bulk of phytosterols used by Ntanios et al. were suspended in oil rather than being dissolved and recrystallized.

In fact, Applicants have determined that little more than 2-3% by weight phytosterols can be conveniently dissolved in fat when heated only to 60° C. Temperatures greater than 60° C. are suggested for fully dissolving these higher concentrations of phytosterols in fats and oils, and preferably temperatures of 75° C., 100° C. or even greater to speed the solubilization process prior to allowing recrystallization to occur. Within the scope of the present invention, for much more dilute phytosterol suspensions than those described by Ntanios et al., i.e., for 2%-6% by weight phytosterol suspensions in fats and oils, temperatures as low as 50° C.-60° C. may eventually promote phytosterol solubilization, albeit at a much slower rate than solubilization at 75° C.-100° C., prior to cooling and formation of TRPs.

Example 2

Crystalline Phytosterol Composition Formed with Triglycerides

One part by weight tall oil-derived phytosterol or one part by weight soybean-derived prilled phytosterol powder (non-esterified phytosterols) described above were each heated with nine parts soybean oil. The temperature required to solubilize these 10% by weight powders in oil was approximately 75-85° C. From Example 1 it was estimated that approximately 8.5% by weight phytosterols (out of 10% total) recrystallized in the oil following cooling to room temperature. Phase contrast microscopic examination (600× magnification) of the solids showed a mixture of extended needle and plate-type crystalline material suspended throughout the mixture, that differed markedly from the amorphous solids originally placed in the triglyceride oil.

Upon reheating, much of the precipitated crystalline material appeared to redissolve very quickly at a temperature 10-20° C. below the original solubilization temperature for the phytosterol powders. Thus, phytosterols first heated and dissolved, and then recrystallized in triglyceride oils appear to be more readily heat-dispersible than purified phytosterol powders. This observation supports the hypothesis that a crystalline phytosterol composition is formed in (or together with) triglycerides, that may be more bioavailable and effective in the mammalian gastrointestinal system than phytosterol alone for reducing cholesterol absorption.

The limited bioavailability of non-solubilized phytosterol powder is evident in the earlier research of Faquhar et al., Kucchodkar et al., and Lees et al. (cited above in the Background). Their research indicated that nine or more grams of phytosterol powder in the human diet were required to achieve a significant decrease in plasma cholesterol. However, using fat-solubilized esterified phytosterols (e.g., the phytosterols in Benecol® margarine), it is now generally appreciated that only 1.5-2 g of such esterified phytosterols are required to achieve a similar cholesterol-lowering effect. This difference in potency between substantially insoluble non-esterified phytosterol and soluble phytosterol esters can be eliminated by heating and fully dissolving phytosterols, and then cooling and recrystallizing the phytosterol in the triglyceride-based medium.

Example 3

Antioxidant Effect and Chemical Stabilization of Cooking Oil Containing Phytosterols Applicants wished to determine whether admixing and dissolving a substantial concentration of phytosterol (e.g., 10% by weight) in a heated cooking oil, would alter the chemical properties or physical cooking properties of the cooking oil. For example, would the presence of phytosterol accelerate the rate of oxidation or rancidity development in the oil, would the oil retain its original flavor, and would the cooking time for a particular food at a specified temperature be appreciably altered? Additionally it was of interest to compare the extent of oil uptake by a food fried in vegetable oil with and without the phytosterol.

Accordingly, 10% by weight of the above-described soybean oil-derived phytosterols were dissolved in a one pound quantity of heated canola oil, and approximately 20 successive small batches of potato chips (russet potatoes, approximately 20 slices, 3-4 g per slice) were fried in each of these oils at 170° C. (338° F.) until a ratio of one pound of finished chips (1.0-1.2 g per chip) had been processed through each pound of oil. An identical quantity of potato chips were fried in plain canola oil as a "control". The similarly heated spent cooking oils and the finished potato chips were evaluated as follows: The extent of canola oil oxidation in each oil sample was measured using an instrument known as a "Foodoil Sensor" (Northern Instruments Corporation, Beachwood, Ohio) that measures the dielectric constant of the oil. This measurement is a direct indicator of the relative content of peroxides, acids, and other polar compounds formed in the oil as it is being degraded. Following "zero-baseline" calibration of the instrument for each unheated cooking oil formulation, the following average dielectric readings were obtained (based upon triplicate measurements) for the potato chip-cooked residual oils.

| | |
|---|---|
| Plain Canola Oil | 1.03 ± 0.10 |
| Canola + 10% soybean phytosterol | 0.79 ± 0.15 |

These readings indicate that contrary to accelerating any oxidation of the canola oil during heating, the presence of phytosterols (10% by weight) significantly stabilized the oil against oxidation, reducing the amount of polar by-products formed in the canola oil during heating by approximately 23%. The anti-oxidant effect and chemical mechanism that would explain this oil stabilization by phytosterols remains to be determined.

A second experiment was carried out to further characterize the antioxidant effect of phytosterols in heated cooking oils. To determine whether a variety of heated edible fats and oils could be "stabilized", i.e., made more resistant to oxidation in air by adding phytosterols, two different levels of soybean oil-derived phytosterols (5% and 10% by weight, and 0% as a control) were added to three different vegetable oils. Each sample of oil (5 gm) was heated in a 100 ml capacity Pyrex® glass beaker for two hours at 170° C. (338° F.). Dielectric readings of these oils following heating (using the same Foodoil Sensor described above) are provided in Table 1. As above, the dielectric reading for each sample prior to the two hour heating in air was used as the zero baseline reference for that sample.

A third experiment was carried out to compare the antioxidative potency of both non-esterified sterols and stanols in heated canola oil. The determination was performed under exactly the same conditions as the second experiment above, except that for the purpose of accelerating the oxidation rate, the heated oil temperature was increased from 170° C. to 190° C. (374° F.).

Results. For each edible oil tested in the second experiment, the addition of phytosterols significantly reduced the dielectric constant as an index of the concentration of polar compounds produced, i.e., oxidation products formed, in the oil during heating at a temperature (170° C.) corresponding to that currently used for deep fat frying of foods. Addition of 10% by weight phytosterols to different vegetable oils resulted in approximately a 30-50% decrease in polar compound formation during the two hour incubation (see Table 1a). This decrease was nearly twice as great the decrease measured for the addition of 5% by weight phytosterols. This suggests that the amount of antioxidant protection provided in edible oils and fats by phytosterols is approximately proportional to the concentration of added phytosterols (at least for that concentration range of phytosterols tested). However, as can be seen from the results of experiment 3 (Table 1b), the effectiveness of non-esterified phytosterols in lowering the rate of oxidation is somewhat reduced by the higher oil temperature. Also, it is important to note that 10% by weight non-esterified stanols when added to canola oil is at least twice as effective in reducing polar compound formation during oil heating, as the same concentration of non-esterified sterols. The chemical explanation for this difference remains unclear.

Before carrying out these experiments, an initial question was whether substantial concentrations of phytosterols (e.g., 5-10% or more) might undesirably act as pro-oxidants during sustained heating of cooking oil. From the series of experiments herein, it is clear that these concentrations of phytosterols act beneficially as mild to moderate antioxidants rather than pro-oxidants.

From these results, it is believed that such phytosterols (sterols, stanols or mixtures thereof) added to edible oils and fats used in prepared food products, will also provide increased shelf-stability for these products, via resistance to oil oxidation and rancidity development at room temperature.

Example 4

Quantitation of Cooking Oil and Phytosterol Absorbed by Potato Chips During Frying Two other potential problems with frying foods in a phytosterol-enriched cooking oil were examined. First, it was considered possible that the amount of fat adsorbed by fried food in a phytosterol-enriched oil might be greater than in regular oil. Accordingly, several tests were conducted using individual potato slices (approximately 4 g each) that had been pre-blotted on paper towels and deep-fried one at a time at a temperature of 180° C. in different cooking oils. Two cooking oils were used (corn oil and canola oil) either with or without 10% soybean-derived prilled phytosterols being added and dissolved in the respective oils. Regardless of which oil was used, and regardless of whether phytosterols were present or absent, the average weight of the fried, drained potato chips, expressed as a percentage of the original weight of the blotted uncooked potato slices, was constant at 31%±1%.

With regard to physically quantitating the amount of absorbed oil, an analysis of the potato chips fried in corn oil on the one hand, and 90% by weight corn oil plus 10% (heat-solubilized) soybean-derived prilled phytosterols on the other hand, showed that the total weight proportion of oil that was solvent-extractable from the fried chips was constant, regardless of whether soy phytosterols were present or not. More specifically, seven potato chips (fried as described above in each of these two oils) were weighed, ground with anhydrous sodium sulfate, and solvent-extracted three times with chloroform:methanol (2:1 vol/vol). This extraction method removes both phytosterols and fats from the food. The combined oil extracts were dried and weighed, and the weight ratio of extracted oil to potato chips determined. The fat content of the corn oil chips was 29±2% and the content of the phytosterol-containing chips was 30±2%.

Second, there was a concern that the fat being adsorbed by a fried food such as potato chips, might be either enriched or alternatively depleted of phytosterols, compared to the proportion of phytosterols dissolved in the original heated cooking oil. In fact, chemical analysis of the 29% by weight cooking oil that had been extracted from the above potato chips (fried in 90% by weight canola oil plus 10% by weight soy oil-derived phytosterols, see above) showed that the extracted oil composition was the same as the frying oil composition (90% oil:10% phytosterol).

Phytosterol analysis employed the following method: Oil plus phytosterol contained in potato chips was first extracted into chloroform. A portion of the chloroform (100 μl) was evaporated, redissolved in a small quantity of isopropyl alcohol (20 μl), and then assayed using Test Kit #352 for cholesterol and other sterols (Sigma Chemical Company, St. Louis, Mo.). A test standard was prepared containing 10 micrograms of beta-sitosterol. This test standard essentially matched the amount of sterol measured in the 100 micrograms of potato chip oil extract. In fact, the average value based upon five measurements from five potato chips was 9.9% by weight phytosterol. This test result indicated that there was no selective uptake or alternatively exclusion of the phytosterols by the potatoes as they were fried.

Therefore, given that the total weight of oil (fat plus phytosterols) adsorbed into the fried food (i.e., potato chips) appears unaffected by added phytosterols, these phytosterols can effectively dilute and replace a portion of the calorie-containing fat, i.e., triglycerides, that would otherwise have been adsorbed by the food during frying. Thus, a further novel benefit of using phytosterols in edible frying (or baking) oils is to reduce the fat calorie content of the prepared food (e.g., in this Example, by approximately 10%). Without actually performing the above quantitative tests, there would be no evidence that phytosterols can substitute one for one for absorbed fat in fried food.

Concerning the amount of phytosterols provided in a one ounce serving of potato chips, most commercial potato chips contain at least 35% by weight vegetable oil. If this vegetable oil contains 10% by weight phytosterols, then a one ounce serving of chips would provide approximately 1.0 g of phytosterols. At a current bulk price of approximately $10.00 per pound for phytosterols, the cost of these phytosterols in a serving of potato chips would be approximately 2 cents.

Example 5

Surface Oiliness of Food Fried in Phytosterol-Containing Vegetable Oil

When non-esterified phytosterols (e.g., 3% by weight or more of phytosterols) extracted from soybeans (or tall oils) are dissolved by heating in liquid vegetable oil or fat and are subsequently cooled, their crystallization causes the oil to solidify. The degree of firmness of the solid depends upon the phytosterol content of the oil. For example, when heated canola oil containing 10% by weight of dissolved soybean phytosterols is cooled, it solidifies to form a solid that is reminiscent of partially hydrogenated vegetable oil (PHVO). Applicants noticed that potato chips fried (as described above) in this oil seemed to leave less oil on ones fingers than similar chips fried in canola oil alone. Since the property of surface oiliness in fried food is generally considered undesirable, an effort was made to quantitate any difference in this property among the potato chips.

A method was devised to measure the relative surface oiliness of potato chips. Potato chips fried for 1 minute at 180° C. in either canola oil or canola plus 10% by weight soybean oil-derived phytosterols were cooled for at least one hour. An assay of the total fat content of these two groups of chips (method, see Example 4) showed that the former contained 26% by weight canola oil while the latter contained 29% by weight canola oil plus phytosterols. Single potato chips were selected (weighing approximately 1.2 g each) and were gently but thoroughly wiped three times on both sides with a single pre-weighed paper tissue (Kimwipe®, Kimberly Clark Paper Products). Each tissue was weighed on an analytical balance before and after wiping to determine the amount of surface oil absorbed from the chip.

From five canola oil fried chips the following amounts of oil were absorbed into each tissue: 10, 7, 7, 8 and 8 milligrams. From five similar chips fried in canola plus 10% by weight phytosterol the following amounts of oil were absorbed: 3, 3, 3, 2 and 4 milligrams. Therefore, based upon an average of 8 mg versus 3 mg of surface oil, it is estimated that 10% by weight phytosterol added to a cooking oil can reduce surface oiliness of potato chips (and presumably other fried and baked foods) approximately 2-3-fold. A similar result was obtained comparing potato chips fried in corn oil with chips fried in corn oil supplemented with 10% by weight soybean oil-derived prilled sterols. In the latter case, an average of 10 mg of oil was absorbed from each corn oil-fried chip and only 3 mg from each corn oil plus soybean phytosterol fried chip.

Example 6

Recrystallized Non-Esterified Phytosterols in Dietary Fat Provide Significant Reduction in Plasma Cholesterol Levels The aim of this study was to determine the hypocholesterolemic efficacy of free, i.e., non-esterified phytosterols (from soybean oil) in a cholesterol-responsive animal model.

Methods. Animal, diets and study design. Twelve male, 5 weeks old Charles River Mongolian gerbils were used in the study. Gerbils were randomly assigned to 2 groups (6 per group). Gerbils were fed for 4 weeks purified diets containing 0.15% cholesterol, with 30% of calories provided by fat. The overall diet contained either 0% or 0.75% of phytosterols and 13.7% fat (detailed diet composition described in Table 2). Therefore, the fat component of the diet contained either 0% or 5.5% (0.75%÷13.7%) phytosterols. Phytosterols were initially heated in the fat component of the diet to allow their dissolution, and then mixed with the other dietary components. Non-esterified sterols were allowed to freely crystallize in the fat component of the mixture as it cooled. All gerbils were given free access to water, and food was provided daily in the predetermined amounts to meet their caloric requirement for growth and maintenance. Animals were housed in groups of 2-3 and were kept in a controlled environment with a 12 h light-dark cycle (light on 18:00 h).

After 4 weeks of feeding of experimental diets gerbils were fasted overnight (18 h), blood samples were collected under light anesthesia with an EDTA-wetted syringe by cardiac puncture, and after exsanguination, livers were excised and weighted. A portion of each liver was stored at −20° C. until analyzed. Plasma was separated from EDTA-treated blood by centrifugation at 12,000×g for 15 min. and analyzed within 1-2 days.

Plasma lipid analysis. Total plasma cholesterol (TC), high density lipoprotein cholesterol (HDL-C), and triglycerides (TG) were measured by enzymatic assays (Sigma Diagnostics kits-procedures #352 for TC and #336 for TG, respectively). HDL-C was assayed in the supernatant after sodium phosphotungstate-Mg2+ precipitation of lipoproteins containing apolipoprotein B and E (Boehringer Mannheim Diagnostics, procedure 543004) according to the procedure described by Weingard and Daggy (Clin. Chem. 1990, 36:575).

Results. No significant differences were observed in body weight among gerbil treatment groups, whereas their plasma lipids varied significantly (Table 3).

When compared to controls, gerbils fed diets supplemented with 0.75% phytosterols and 0.15% cholesterol in the form of free phytosterols had somewhat smaller livers (10% less mass) that contained a dramatically reduced level (87-91% reduced) of esterified cholesterol (data not shown). Plasma cholesterol levels in the same gerbils were 53-57% lower than in the control group; HDL-C was lowered to lesser degree (23-29%) and the TC/HDL ratio was improved (decreased) significantly (by 35-40%, data not shown). Plasma triglycerides were not statistically reduced by sterol supplementation.

Discussion and Conclusion. Since non-esterified phytosterols have very limited solubility (1.5% by weight) in dietary fat, and these sterols were added to the dietary fat at a concentration of 5.5% by weight, most (4%÷5.5% or approximately 73%) of these plant sterols were ingested in the dietary fat as a triglyceride-recrystallized phytosterol (TRP) composition or complex. That is, the non-esterified sterols were first dissolved in dietary fat by heating, and then cooled, resulting in their crystallization. Therefore, it is significant and surprising that liver and plasma cholesterol-lowering results described above for the non-esterified sterols were very favorable. More specifically, dietary supplementation with 0.75% non-esterified sterols resulted in over 50% lower plasma cholesterol levels and approximately 90% lower liver cholesteryl ester levels (data not shown), with a 35% improved (lower) TC/HDL-C ratio. The results of this experiment show that the hypocholesterolemic efficacy of non-esterified sterol preparations recrystallized in fat is comparable to that reported in the literature for fat-soluble esterified sterols and stanols.

Example 7

Non-Esterified Sterols Absorbed by Potato Chips During Frying or Dissolved and Recrystallized in Free Dietary Fat Can Reduce Plasma Cholesterol Levels A. Gerbil Study The aim of this study was to evaluate the hypocholesterolemic efficacy of potato chips enriched with non-esterified sterols (derived from soybean oil) using the same animal model system (see Example 6).

Methods. Animal, diet and study design. Fourteen male, 5 weeks old Charles River Mongolian gerbils were used in the study. All gerbils were randomly assigned into two groups (7 gerbils per group) and were fed for 4 weeks purified diets containing 0.15% cholesterol. The detailed diet compositions are described in Table 3. All diets contained 13.7% by weight fat, with 30% of the dietary calories being provided by the fat. Free (non-esterified) sterols were introduced into the diet at a level of 0.75% by weight in the form of either:

Phytosterol-enriched potato chips. Potato chips were fried in canola oil that was either supplemented or not supplemented with soybean oil-derived phytosterols (10% by weight). When phytosterols were added, they rapidly dissolved in the oil that had been heated to 180° C. prior to frying the chips.

The control diet (see Table 4 for dietary composition) provided no sterols but contained regular commercial potato chips fried in canola oil, to provide the same level of carbohydrate and the standard level of dietary fat (13.7%). All other experimental conditions, including animal maintenance, feeding, sample collecting and analytical methods were the same as described above (see Example 6).

Hepatic cholesterol analysis. Free liver cholesterol (FC) and esterified liver cholesterol (EC) were determined by HPLC based on the method of Kim and Chung (Korean J. Biochem. 1984, 16:69). The free cholesterol and cholesteryl esters were separated using a Waters Radial-Pack, C 18 column eluted isocratically with acetonitrile/isopropanol (50/50 by volume) at 2.0 ml/min. Absorbance of the eluate was measured at 210 nm using a UV detector. Cholesterol concentrations (free and esterified) were calculated by comparing the peak areas for the samples with those obtained for the calibration standards (Sigma Chemical Co.). To calculate esterified cholesterol, the sum of cholesteryl esters was divided by 1.67 (calculation according to Witztum et al., *J. Lipid Res.* 1985, 26:92).

Results. The body weights of gerbils in both groups, after 4 weeks of feeding were not significantly different, whereas gerbil liver weights, liver cholesterol, and plasma lipid concentrations varied significantly (Table 5). Gerbils fed diets containing phytosterol-enriched potato chips had significantly lower liver cholesterol and plasma cholesterol levels when compared to gerbils consuming a control diet lacking sterols. Consistent with these findings, it is significant to note that gerbils fed a diet containing regular potato chips together with the same amount of nonesterified phytosterols that had been dissolved and recrystallized in an equivalent quantity of canola oil, the plasma and liver cholesterol profiles were found to be very similar to those fed the phytosterol-enriched potato chips (data not shown).

Discussion and Conclusions. The hypocholesterolemic efficacy of nonesterified phytosterols in fortified potato chips was similar to that observed when phytosterols were provided in exogenous dietary fat (fully dissolving and then recrystallizing in free canola oil). The ratio of free phytosterols to fat in the standard fat level diets was 0.75%/13.7%=5.5%. Applicants have shown that the solubility limit of free sterols in vegetable oil is approximately 1.5%. Therefore, as pointed out previously, most (4%÷5.5%=73%) of the free phytosterol that was initially dissolved by heating in the dietary fat (or potato chip fat) was subsequently recrystallized to form what Applicants have termed a triglyceride-recrystallized phytosterol (TRP) composition.

In the present Example, when plant phytosterols are heated and dissolved in a fat which is then cooled, the sterols crystallize together with triglycerides, and the morphology, i.e., the shape and size, of the solid material changes. At 400× magnification, large plates and extended arrays of needle bundles of sterols associated with fat are visible under a microscope. These crystalline phytosterol-triglyceride solids differ in their physical properties (melting temperature and crystalline appearance) from finely milled, and/or microcrystalline particles described by Tiainen et al., that have not first been dissolved and intimately combined with a triglyceride-based fat or oil.

Based upon the results of this experiment we can conclude that frying foods, such as potato chips, in a fat or oil supplemented with free sterols is a convenient and effective way of enriching a food with cholesterol lowering free phytosterols.

B. Human Pilot Study

Having completed the above studies in gerbils, a human pilot study was conducted to assess the hypocholesterolemic efficacy of ingestion of a food enriched with non-esterified phytosterols. For this study, a manufacturer of tortilla chips prepared tortilla chips cooked in either normal fry oil or that oil containing an 8:1 ratio of fat-to-free phytosterols isolated from soybean oil. Two 1 oz bags of test chips provided 1.5 g of phytosterol/day. The final design of the study included 12 moderately cholesterolemic subjects (8 males, 4 females) and two test groups. Subjects initially consumed either the control chips (no sterols) or test chips (with sterols). Because the majority (n=7) of subjects agreed to crossover to the opposite chip after completing their first 4 wk assignment, two sets of data were obtained: a straight comparison of baseline lipid values with values after 4 wk of chips plus sterols (n=10) versus a similar comparison for 9 subjects who ate the sterol-free chips (Table 6) . . . and a second, statistically stronger direct paired-t test for the crossover data (n=7), where each person was their own control for the two different chips (Table 7).

In the statistically stronger comparison (Table 7) both plasma cholesterol and LDL-C, as well as the LDL/HDL ratio, declined about 10-15% (clinically meaningful) without lowering beneficial HDL-C in the 7 crossover subjects when consuming sterol-enriched test chips compared to their response when eating the sterol-free chips. All 7 subjects in the crossover group revealed a drop in LDL between 10 and 40 mg/dl. By contrast, no significant effect was observed for the 10 subjects during consumption of the control chips (non-phytosterol-containing) (Table 6). The expanded group of 9 who consumed phytosterols responded comparably to the subgroup of 7 who also crossed over to sterol-free chips.

These data confirm that free phytosterols, when adequately dissolved and recrystallized in fat, perform as well as phytosteryl esters in their cholesterol-lowering capacity. These results, coupled with the recent FDA allowance for a heart-healthy claim for >0.4 grams of free phytosterols per serving on such food items, indicate that this form of phytosterol delivery is very beneficial.

Example 8

Non-Esterified Phytosterols Dissolved and Subsequently Recrystallized in Vegetable Oil Triglycerides can Prevent Oil Separation in Peanut Butter The large solubility differential between non-esterified plant sterols dissolved in hot versus cold vegetable oil can be used advantageously in formulating certain foods. As pointed out previously, most of an initial concentration of 10% by weight plant sterols dissolved in heated vegetable oil, e.g., potato chip frying oil, will recrystallize with triglycerides as the oil is cooled. In the case of potato chips, crystallization of plant sterols in the oil reduces the surface oiliness of the chips. The presence of sterols in a heated vegetable oil was also shown to reduce the amount of polar oxidation breakdown products in that oil as it is heated over a period of time (see Examples 3 and 10).

In the case of other high fat foods such as peanut butter, which contains up to 50% by weight peanut oil, between approximately 3% and 5% by weight of non-esterified plant sterols may be dissolved by heating at 80-100° C. for 1-10 minutes in the peanut butter. Based upon the 50% peanut oil content, the sterols will be present in the oil portion of the peanut butter at a level of approximately twice the initially added levels, i.e., 6%-10% by weight in the oil portion. Applicants have discovered that as little as 3% by weight non-esterified soybean oil-derived prilled phytosterols, dissolved by heating and subsequently cooled in peanut butter, has proven effective in partially solidifying the peanut oil found in a natural peanut butter. This partial solidification prevents the natural oil separation process that is regarded as an undesirable annoyance in natural peanut butter. This percentage of phytosterol provides 0.9 grams sterol per 32 g serving of peanut butter or approximately 100% of the daily amount of plant sterols recommended for achieving a 10-15% reduction in the human plasma cholesterol level. This daily dose is approximately equivalent to the recommended dose of 1.3-1.5 grams of sterol esters (as provided in commercial cholesterol-reducing margarines) in which only 60% by weight of the sterol esters consists of the active sterol moiety.

Example 9

Non-Esterified Phytosterols Dissolved and Subsequently Recrystallized in Cocoa Butter Triglycerides can be Incorporated into Chocolate Cocoa Butter has a melting temperature above room temperature but below body temperature (37° C.). This property allows chocolate, a processed food containing approximately 30% by weight cocoa butter, to remain solid at room temperature, and to melt in ones mouth. Soybean oil phytosterols were added to cocoa butter at a concentration of 10% by weight, and were dissolved by heating. The cocoa butter was subsequently cooled and solidified.

A test of the softening and melting temperatures for the phytosterol-supplemented and unsupplemented cocoa butters showed that both were softening at approximately 30° C., and melted at approximately 34° C. At 34° C., while cocoa butter became transparent, phytosterol-supplemented cocoa butter remained translucent to opaque, and exhibited a greater viscosity owing to the presence of suspended phytosterol particles. Under the light microscope (800× magnification), the recrystallized phytosterols appeared as a fine suspension of slender needles and microparticles approximately 1-5 microns in width or diameter. Thirty percent phytosterol-supplemented cocoa butter, the latter containing 10% by weight phytosterols, was successfully incorporated into a sweet chocolate composition. The phytosterols (3% of the chocolate by weight) had a negligible effect on the taste and texture of this processed food.

Example 10

Oxidative Stabilization of Vegetable Oils Fortified with Non-Esterified Phytosterols in Production Environment In addition to the hypocholesterolemic effect of the ingestion of fat-recrystallized phytosterols, we discovered that vegetable oils fortified with free phytosterols are substantially stabilized against oxidation (and rancidity of stored product). This stabilization was tested in a commercial tortilla chip production setting, with analysis according to AOCS Recommended Practice Cd 12b-92.

The OSI measurements (each value is an average of duplicate samples, with testing carried out at 110 degrees C.) were determined by the Archer Daniels Midland (ADM) company (Decatur, Ill.) using high oleic safflower oil samples that had been used to prepare tortilla chips. The chips were prepared, and the oil samples harvested by the Warnock Food Company from heated tanks used to fry the tortilla chips. These tortilla chips (prepared from standard masa flour plus 1% by weight salt) were used in the human pilot study reported in Example 7. After frying, the tortilla chips contained 22% by weight of oil.

When phytosterols were included in the oil at a level of 12% by weight, a serving of 1 oz. (28 g) of the chips provided 22%×12%×28 g or 0.74 g phytosterols per serving. The original safflower oil (obtained from Adams Vegetable Oil, Arbuckle, Calif.) contained 77% by weight oleic acid, 14% linoleic acid, and 8% palmitic plus stearic acids. This oil had a stability index (OSI value) of 11.3 hours before frying was commenced. After the frying of approximately 150 pounds of tortilla chips, and maintaining the oil at a temperature of 185 degrees C. for 6 hours, the OSI value of the oil had decreased to 9.5 hours.

Subsequently, fresh safflower oil and unmodified (non-esterified) soybean phytosterols (provided by ADM) were used to prepare an oil blend containing 88% by weight safflower oil and 12% by weight phytosterols. This oil blend had a stability (OSI value) of 14.9 hours before frying was commenced. After frying approximately 132 pounds of the tortilla chips, and maintaining the oil at a temperature of 185 degrees C. for 6 hours, the OSI value of the oil remained essentially the same (15.1 hours).

We concluded that non-esterified phytosterols exert an antioxidant effect on a heated edible oil that carries the phytosterols, where the edible oil may be subjected to the oxidative impact of heat combined with air and food contact. The phytosterols, added at a level of 12% by weight, actually increased the oxidative stability of the original oil from 11.3 hours to 14.9 hours as measured prior to heating.

The phytosterols also reduced the loss in oxidative stability that accompanies heating of edible oils, e.g., compare the decrease in OSI value from 11.3 to 9.5 hours during 6 hours of heating and frying with safflower oil lacking phytosterols versus the OSI stability that is maintained in the presence of phytosterols (14.9 and 15.1 hours respectively).

Furthermore, for application to prepared foods, we have observed that the shelf life (freshness) of phytosterol-fortified, fat-containing processed chips is extended owing to oxidative stabilization of the fat.

Unless otherwise defined herein, all terms have their ordinary meanings as understood by one of ordinary skill in the field to which the invention pertains. All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, TRPs that are constituted using other sources of phytosterols and/or fats and oils not listed herein, or TRPs incorporated into various prepared foods not listed herein, or a combination of other phytosterol sources and other prepared foods all within the scope of the present invention. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention.

Thus, additional embodiments are within the scope of the invention and within the following claims.

TABLE 1a

Oxidation of heated (170°C.) oils with or without non-esterified sterols (Example 3a)

|  | Increase in Dielectric Constant * 2 hrs |
|---|---|
| Canola oil | 1.48 |
| Canola oil + 5% Non-esterified Sterols | 1.09 |
| Conola oil + 10% Non-esterified Sterols | 0.70 |
| Soybean oil | 2.09 |
| Soybean oil + 5% Non-esterified Sterols | 1.72 |
| Soybean oil + 10% Non-esterified Sterols | 1.46 |
| Cottonseed oil | 1.94 |
| Cottonseed oil + 5% Non-esterified Sterols | 1.46 |
| Cottonseed oil + 10% Non-esterified Sterols | 0.85 |

* Oxidation of oils was determined using "Foodoils Sensor" which measures the dielectric constant of polar compounds formed in the oil during heating. Values indicates relative (to baseline) increases in peroxides, acids and other polar components formed in the oil during heating. The oils (5 g) were heated with or without prilled phytosterols in 100 mL beakers at 170° C..

TABLE 1b

Oxidation of heated (190° C.) canola oils with or without non-esterified sterols or stanols (Example 3b)

|  | Increase in Dielectric Constant * | |
|---|---|---|
|  | 2 hrs | 4 hrs |
| Canola oil | 3.22 | 7.78 |
| Canola oil + 10% Non-esterified Sterols | 2.84 | 7.33 |
| Conola oil + 10% Non-esterified Stanols | 2.23 | 6.38 |

* Oxidation of oils was determined using "Foodoils Sensor" which measures the dielectric constant of polar compounds formed in the oil during heating. Values indicates relative (to baseline) increases in peroxides, acids and other polar components formed in the oil during heating. The oil (5 g) were heated with or without prilled phytosterols in 100 mL beakers at 190° C..

TABLE 2

Composition of purified diets for gerbils (Example 6)

|  |  | Diet (gram per 1.0 kilo) | |
|---|---|---|---|
| INGREDIENT | % | Control (Without Phytosterols) | Non-esterified Phytosterols |
| Casein | 20 | 200 | 200 |
| Sucrose | 20 | 200 | 200 |
| Cornstarch | 29.6-28.9 | 296 | 289 |
| Cellulose | 10 | 100 | 100 |
| Fat: | 13.7 |  |  |
| Coconut oil | 8.1 | 81 | 81 |
| Canola | 4.3 | 43 | 43 |
| Soybean oil | 1.3 | 13 | 13 |
| Mineral mix (Ausman - Hayes) | 5.0 | 50 | 50 |
| Vitamin mix (Hayes - Cathcart) | 1.2 | 12 | 12 |
| Choline chloride | 0.3 | 3 | 3 |

TABLE 2-continued

Composition of purified diets for gerbils (Example 6)

| | | Diet (gram per 1.0 kilo) | |
|---|---|---|---|
| INGREDIENT | % | Control (Without Phytosterols) | Non-esterified Phytosterols |
| Free Phytoterols (prilled soybean | 0.75 | 0 | 7.5 |
| Cholesterol | 0.15 | 1.5 | 1.5 | premixing it with 800 mL of boiling water, to form a gel to which the remaining ingredient were added.

TABLE 3

Plasma lipids of gerbils fed for 4 weeks diets without or with non-esterified phytosterols (Example 6).

| | Diet Groups | |
|---|---|---|
| | Control (Without Phytosterols) | Non-esterified Phytosterols (Prilled Soybean) |
| Body weight (g) | | |
| initial | 53 ± 3 | 52 ± 2 |
| final | 66 ± 4 | 65 ± 3 |
| Plasma (mg/dL) | | |
| TC | 153 ± 7 | 99 ± 9* |
| TG | 33 ± 10 | 24 ± 3 |

Values are Mean ± SD (n = 5, 6)
*Significantly different ($p < 0.05$) from control group.

TABLE 4

Composition of purified diets for gerbils (Example 7)

| | | Diet (gram per 1.0 kilo) | |
|---|---|---|---|
| INGREDIENT | % | Chips without phytosterolsterols | Chips with free phytosterols (prilled soybean) |
| Casein | 20 | 200 | 200 |
| Dextrose | 20 | 200 | 200 |
| Cornstarch | 10.6 | 106 | 106 |
| Starch with chips | 0-19.8 | 191 | 191 |
| Cellulose | 10 | 100 | 100 |
| Fat: | 1.0-13.7 | | |
| Coconut oil | | 62 | 62 |
| Fat from chips | | 75 | 67 |
| Soybean oil | | 0 | 0 |
| Mineral mix (Ausman - Hayes) | 5.0 | 50 | 50 |
| Vitamin mix (Hayes - Cathcart) | 1.2 | 12 | 12 |
| Choline chloride | 0.3 | 3 | 3 |
| Chips prepared in canola oil | | 268 | |
| Chips prepared in canola oil w. 10% free phytosterols (soybean) | | 0 | 268 |
| Cholesterol | 0.15 | 1.5 | 1.5 |

Diets were fed as gel blocks, prepared by withholding from formulation 60 g/kg of cornstarch and premixing it with 800 mL of boiling water, to form a gel to which the remaining ingredient were added.

TABLE 5

Plasma and liver lipids of gerbils fed for 4 weeks diets with phytosterols enriched potato chips (Example 7).

| | Diet groups: | |
|---|---|---|
| | Chips Without Phytosterols | Chips With Non-esterified Phytosterols (Prilled Soybean) |
| Body weight(g) | | |
| initial | 51 ± 4 | 51 ± 2 |
| final | 66 ± 3 | 64 ± 2 |
| Liver weight (% BW) | 3.1 ± 0.1 | 2.8 ± 0.1* |
| Cecum weight (% BW) | 2.7 ± 0.5 | 2.9 ± 0.4 |
| Adipose (Perirenal) wt (% BW) | 0.32 ± 0.11 | 0.38 ± 10.07 |
| Liver cholesterol | | |
| TC (mg/g) | 39 ± 6 | 13 ± 4* |
| FC (mg/g) | 5 ± 1 | 5 ± 0 |
| EC (mg/g) | 34 ± 6 | 8 ± 4* |
| Plasma | | |
| TC (mg/dL) | 190 ± 45 | 99 ± 11* |
| TG (mg/dL) | 51 ± 9 | 44 ± 6 |
| HDL-C (mg/dL) | 68 ± 9 | 58 ± 9 |
| TC/HDL-C ratio | 2.9 ± 1.1 | 1.7 ± 0.2* |

Values are Mean ± SD (n = 5 – 7, liver cholesterol n = 4)
*Significantly different ($p < 0.05$) from control group

TABLE 6

Effect of two 1 oz bags of Tortilla chips/day, providing either 1.5 g or no phytosterols, on plasma lipids in humans for 4 wk (all subjects).

| | Tortilla chips | | | | | |
|---|---|---|---|---|---|---|
| | Chips without phytosterols | | | Chips with phytosterols | | |
| | Baseline | After 4 wk of chips | % change | Baseline | After 4 wk of chips | % change |
| Plasma | | | | | | |
| TC (mg/dL) | 226 ± 34 | 223 ± 32 | minus 1.3 | 234 ± 32 | 208 ± 30* | minus 10.3 |
| TG (mg/dL) | 101 ± 52 | 103 ± 50 | plus 2.0 | 117 ± 66 | 117 ± 45 | 0 |

TABLE 6-continued

Effect of two 1 oz bags of Tortilla chips/day, providing either 1.5 g or no phytosterols, on plasma lipids in humans for 4 wk (all subjects).

| | Tortilla chips | | | | | |
|---|---|---|---|---|---|---|
| | Chips without phytosterols | | | Chips with phytosterols | | |
| | Baseline | After 4 wk of chips | % change | Baseline | After 4 wk of chips | % change |
| HDL-C (mg/dL) | 45 ± 11 | 45 ± 11 | 0 | 45 ± 10 | 46 ± 10 | plus 2.2 |
| LDL-C (mg/dL) | 161 ± 37 | 157 ± 35 | minus 2.5 | 166 ± 42 | 141 ± 39* | minus 15.1 |
| LDL/HDL-C ratio | 4.3 ± 1.1 | 4.2 ± 0.9 | minus 2.3 | 4.0 ± 1.5 | 3.3 ± 1.3* | minus 17.5 |

Values are Mean ± SD (n = 9 – 10); TC = total cholesterol; TG = triglycerides; HDL-C = high-density lipoprotein cholesterol; LDL-C = low-density lipoprotein cholesterol;
*Significantly lower than baseline (p < 0.05) by paired t-test.

TABLE 7

Effect of two 1 oz bags Tortilla chips, providing either 1.5 g/d or no phytosterols, on plasma lipds of humans after 4 wks (crossover data only).

| | | Tortilla chips | | |
|---|---|---|---|---|
| | Baseline | without phytosterols | with phytosterols | % change |
| Plasma | | | | |
| TC (mg/dL) | 232 ± 36 | 228 ± 33 | 205 ± 34* | minus 10.1 |
| TG (mg/dL) | 111 ± 52 | 110 ± 58 | 118 ± 46 | plus 7.2 |
| HDL-C (mg/dL) | 48 ± 10 | 49 ± 10 | 49 ± 10 | 0 |
| LDL-C (mg/dL) | 162 ± 41 | 157 ± 38 | 133 ± 41* | minus 15.3 |
| LDL/HDL-C ratio | 3.6 ± 1.3 | 3.4 ± 1.2 | 2.9 ± 1.2* | minus 14.7 |

Values are Mean ± SD (n = 7); TC = total cholesterol; TG = triglycerides; HDL-C = high-density lipoprotein cholesterol; LDL-C = low-density lipoprotein cholesterol
*Significantly decrease on chips with phytosterols (p < 0.05) by paired t-test.

What is claimed is:

1. A dietary supplement comprising
   at least one triglyceride-based edible fat; and
   between 3% and 50% by weight of triglyceride recrystallized phytosterols (TRPs),
   wherein said TRPs precipitate and recrystallize at room temperature;
   wherein said TRPs are formed without segregating said phytosterols from said triglyceride-based edible fat-containing composition;
   wherein said TRPs have a reduced melting temperature compared to segregated phytosterols.

2. The dietary supplement of claim 1, wherein said supplement consists essentially of said fat and said non-esterified phytosterol.

3. The dietary supplement of claim 1 in a form selected from the group consisting of capsule, pill, and wafer.

4. The dietary supplement of claim 1, wherein said TRPs are combined with dietary components selected from the group consisting of protein, vitamins, minerals, and combinations thereof.

* * * * *